(12) United States Patent
Ng

(10) Patent No.: US 10,405,521 B2
(45) Date of Patent: Sep. 10, 2019

(54) CHEW TOY FOR DOGS

(71) Applicant: FFD Designs (Canada) Inc., Richmond Hill (CA)

(72) Inventor: Cheryl Ng, Richmond Hill (CA)

(73) Assignee: FFD Designs (Canada) Inc., Richmond Hill, Ontario (CA)

( * ) Notice: Subject to any disclaimer, the term of this patent is extended or adjusted under 35 U.S.C. 154(b) by 205 days.

(21) Appl. No.: 15/406,092

(22) Filed: Jan. 13, 2017

(65) Prior Publication Data

US 2018/0199545 A1    Jul. 19, 2018

(51) Int. Cl.
*A01K 15/02* (2006.01)
*A63H 3/02* (2006.01)

(52) U.S. Cl.
CPC .............. *A01K 15/026* (2013.01); *A63H 3/02* (2013.01)

(58) Field of Classification Search
CPC ............................. A01K 15/026; A61C 15/00
USPC ................. 119/707, 708, 709, 710; D30/160
See application file for complete search history.

(56) References Cited

U.S. PATENT DOCUMENTS

| | | | | |
|---|---|---|---|---|
| 5,263,436 A * | 11/1993 | Axelrod | ............... | A01K 15/026 119/710 |
| D376,449 S * | 12/1996 | Axelrod | ....................... | D30/160 |
| D393,671 S * | 4/1998 | Honaker | ..................... | D21/707 |
| D407,868 S * | 4/1999 | Axelrod | ....................... | D30/160 |
| 5,921,255 A * | 7/1999 | Garita | .................... | A61C 15/00 119/709 |
| 6,116,191 A * | 9/2000 | Suchowski | ......... | A01K 15/026 119/707 |
| D435,660 S * | 12/2000 | Yoo | .............................. | D24/211 |
| 6,432,071 B1 * | 8/2002 | Hsieh | ................. | A61H 23/0263 601/131 |
| D473,683 S * | 4/2003 | Willinger | ............. | A01K 15/026 D30/160 |
| D497,457 S * | 10/2004 | Willinger | ............. | A01K 15/026 D24/211 |
| D529,667 S * | 10/2006 | Axelrod | ....................... | D30/160 |
| D583,519 S * | 12/2008 | Roberts | ....................... | D32/29.1 |
| 7,490,579 B2 * | 2/2009 | Axelrod | ............... | A01K 15/026 119/707 |
| D624,713 S * | 9/2010 | Rutherford | .................. | D30/160 |
| D636,948 S * | 4/2011 | Axelrod | ....................... | D30/160 |
| D636,949 S * | 4/2011 | Axelrod | ....................... | D30/160 |
| D646,448 S * | 10/2011 | Cheng | .......................... | D32/29.1 |
| D658,824 S * | 5/2012 | Viola | ........................... | D30/160 |
| D667,176 S * | 9/2012 | Crane | .......................... | D24/104 |
| 8,312,844 B2 * | 11/2012 | Mann | ................... | A01K 15/025 119/709 |
| D672,513 S * | 12/2012 | Wolfe, Jr. | .................... | D30/160 |
| D677,439 S * | 3/2013 | Renforth | ...................... | D30/160 |
| D700,412 S * | 2/2014 | Loebach | ..................... | D32/29.1 |
| D712,469 S * | 9/2014 | Riddle | .......................... | D19/59 |
| 8,925,494 B2 * | 1/2015 | Pang | ................... | A01K 15/026 119/709 |

(Continued)

*Primary Examiner* — Yvonne R Abbott-Lewis
(74) *Attorney, Agent, or Firm* — Rowand LLP

(57) ABSTRACT

A chew toy is disclosed. The chew toy includes an elongate body formed as a capsule having opposed first and second ends; and a plurality of projections extending radially outward from and substantially perpendicular to an exterior surface of the body, at least one of the plurality of projections having a pointed tip at a distal end, wherein the plurality of projections are distributed on the exterior surface in spaced relation to each other.

19 Claims, 3 Drawing Sheets

Side elevational view    Side cross-sectional view

(56) References Cited

U.S. PATENT DOCUMENTS

| | | | |
|---|---|---|---|
| D724,802 S * | 3/2015 | Krenkler | D32/29.1 |
| 9,021,990 B2 * | 5/2015 | Rutherford | A01K 15/026 |
| | | | 119/707 |
| D763,519 S * | 8/2016 | Anderson | D21/623 |
| D809,219 S * | 1/2018 | Wright | A01K 13/001 |
| | | | D30/160 |
| D821,040 S * | 6/2018 | Loibl | D30/160 |
| 2006/0102099 A1 * | 5/2006 | Edwards | A01K 15/026 |
| | | | 119/710 |
| 2007/0227464 A1 * | 10/2007 | Axelrod | A01K 15/026 |
| | | | 119/709 |
| 2013/0273125 A1 * | 10/2013 | Barnvos | A01K 29/00 |
| | | | 424/401 |
| 2013/0305999 A1 * | 11/2013 | Axelrod | A01K 15/026 |
| | | | 119/710 |
| 2014/0230752 A1 * | 8/2014 | Yerton | A01K 15/026 |
| | | | 119/709 |
| 2015/0083052 A1 * | 3/2015 | Glaser | A01K 15/026 |
| | | | 119/709 |
| 2015/0313185 A1 * | 11/2015 | Barnvos | A01K 15/026 |
| | | | 119/709 |

* cited by examiner

CHEW TOY FOR DOGS

TECHNICAL FIELD

The present disclosure relates to dog toys and, in particular, to toys that are suitable for chewing by dogs.

BACKGROUND

Similar to their human counterparts, dogs can experience a range of dental health problems. Food particles and bacteria can collect along gum lines in a dog's mouth and form plaque. If plaque is not routinely removed, minerals in the saliva can combine with the plaque and form tartar which adheres tightly to teeth surfaces. The presence of bacteria and tartar growth can cause, among others, malodor, swelling, gum irritation, infection, and even lead to periodontal disease.

In addition to regular cleaning by owners, chew products may be used to facilitate cleaning a dog's teeth. Chew objects can be designed to have shapes that are suitable for removing accumulations and massaging a dog's teeth and gums when the objects are chewed or gnawed on by a dog. For example, various chew toys resembling spiked balls (i.e. spherical or ball-shaped toys having a plurality of spikes on their exterior) are available for purchase on the market. There may be certain drawbacks to such ball-shaped chew toys, as they may potentially pose a choking hazard for some dogs and may not be effective for engaging different parts of a dog's teeth or gum surfaces for cleaning.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a chew toy. The chew toy includes an elongate body formed as a capsule having opposed first and second ends, and a plurality of projections extending radially outward from and substantially perpendicular to an exterior surface of the body, with at least one of the plurality of projections having a pointed tip at a distal end. The plurality of projections are distributed on the exterior surface of the body in spaced relation to each other.

In another aspect, the present disclosure describes a dog toy. The dog toy includes a chew toy and a fabric casing enclosing the chew toy, the fabric casing having an interior space for receiving the chew toy. The chew toy includes an elongate body formed as a capsule having opposed first and second ends, and a plurality of projections extending radially outward from and substantially perpendicular to an exterior surface of the body, with at least one of the plurality of projections having a pointed tip at a distal end. The plurality of projections are distributed on the exterior surface of the body in spaced relation to each other.

Other example embodiments of the present disclosure will be apparent to those of ordinary skill in the art from a review of the following detailed descriptions in conjunction with the drawings.

Figure 1:
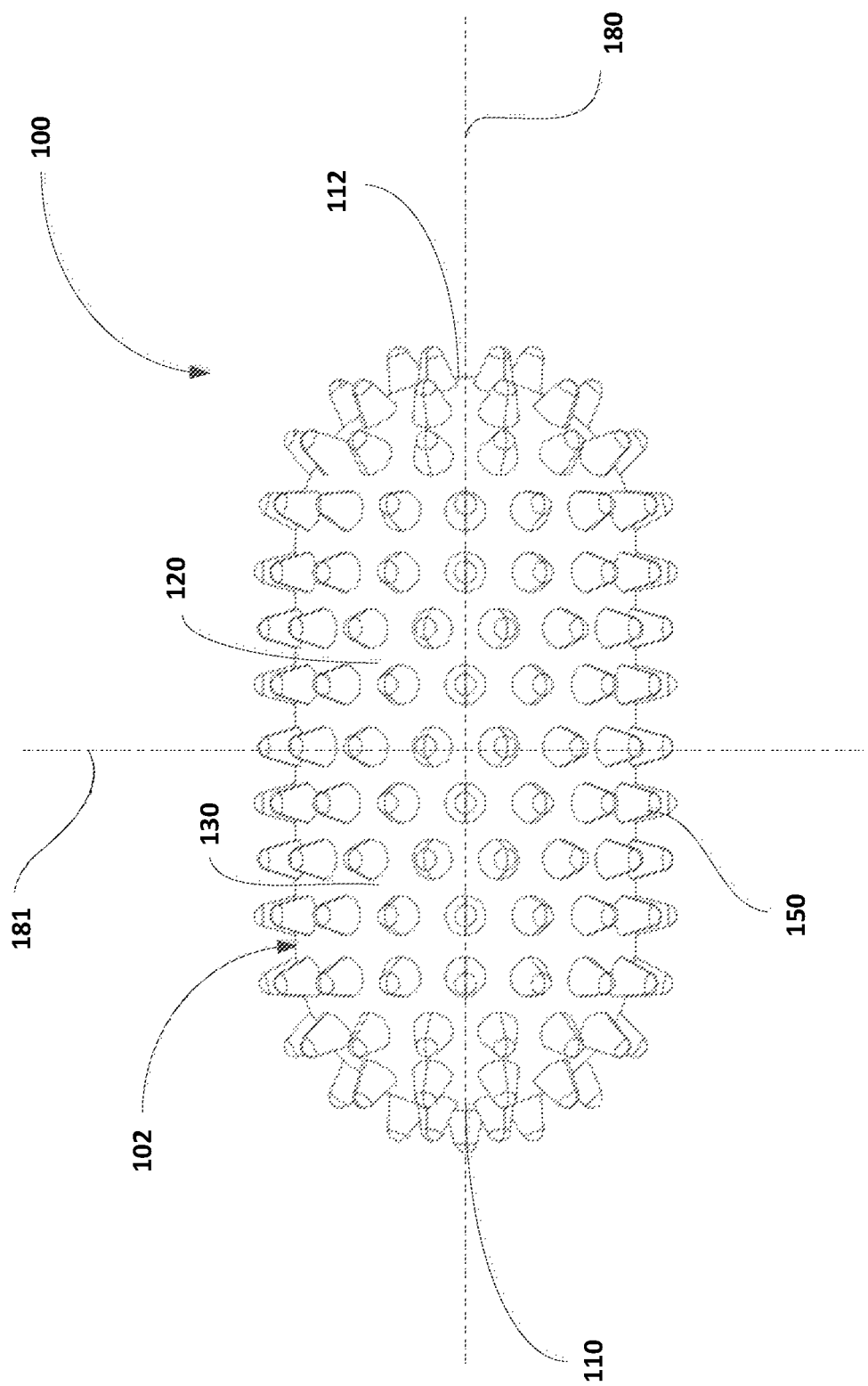
FIG. 1 is a side elevational view of an example chew toy in accordance with example embodiments of the present disclosure.

Reference is first made to FIG. 1, which shows a side elevational view of an example chew toy 100. The chew toy 100 can be used to provide amusement for a dog and may yield health benefits by facilitating removal of plaque and tartar from a dog's teeth. The chew toy 100 includes an elongate body 102. The body 102 is formed as a capsule having a first end 110 and an opposed second end 112. More specifically, in at least some embodiments, the body 102 has a capsule shape, comprising a central cylindrical portion 120 which has a first end 110 and a second end 112 that are both generally dome-shaped. The central cylindrical portion 120 may be a cylinder or a cylindrical tube, and the dome-shaped ends 110 and 112 may be hemispherical caps located at opposite ends of the central cylindrical portion 120. In particular, the dome-shaped ends 110 and 112 form curved and convex end surfaces of the body 102. The dome-shaped ends 110 and 112 need not be hemispherical; in some embodiments, one or both of the dome-shaped ends 110 and 112 may comprise any generally curved surface forming an arcuate, closed end of the cylindrical portion 120.

The body 102 may be a unitary construction, or it may be a composite of two or more components. In some embodiments, the cylindrical portion 120 and the dome-shaped ends 110 and 112 may be separably assembled into a single body. For example, each dome-shaped portion 110 and 112 may be configured for coupling to a respective end of a cylindrical tube comprising the central cylindrical portion 120. In some other embodiments, the body 102 may be a composite of two capsule halves that are fixedly secured (e.g. molded, glued, etc.) to each other. For example, each capsule half may include a cylindrical wall having a dome-shaped surface forming a closed end and an open end that is configured to be joined with an open end of the other capsule half when the two halves are assembled into a single body. The two halves may, for example, be symmetric in shape and dimensions. In some other embodiments, the body 102 may be a unitary structure having walls that define a central cylindrical portion 120 and dome-shaped ends 110 and 112 that are integral with the cylindrical portion 120. For example, the body 102 may be injection molded, whereby the constituent materials for the body 102 are melted and forced into a mold cavity and allowed to cool and harden to the configuration of the cavity.

In at least some embodiments, the chew toy 102 has a generally symmetrical shape. For example, the body 102 may be symmetric about a central axis 180 that extends longitudinally through the opposed ends 110 and 112. The axis 180 extends lengthwise of the body 102 between the polar ends 110 and 112 and is centrally disposed in the body 102. As a further example, the body 102 may be symmetric about a plane 181 which is perpendicular to and bisects a line extending between the ends 110 and 112. In other words, the two halves of the body 102 defined by the plane 181 may be symmetrical.

The body 102 is dimensioned to be suitable for chewing by dogs of various sizes. In the example of FIG. 1, the central cylindrical portion 120 of the body 102 is a cylindrical tube having a radius of between 1.5 and 3.0 centimeters and a height of between 4.5 and 6.0 centimeters. The dome-shaped ends 110 and 112 are hemispherical, having the same radius as the central cylindrical portion 120. In some embodiments, the length of the body 102 (i.e. distance between the opposed ends 110 and 112) is between 8.0 and 10.0 centimeters.

The chew toy 100 includes a plurality of projections 150 that extend radially outward from an exterior surface 130 of the body 102. The projections 150 may, for example, be integral with the body 102. When a dog chews on the chew toy 100, the chew toy 100 is moved around in the dog's mouth, causing one or more projections 150 to come in contact with the surfaces of the dog's teeth, the spaces between adjacent teeth, and/or gum surfaces. As a result, the projections 150 may be useful for dislodging food particles and bacteria from the dog's teeth, thereby facilitating prevention of plaque or tartar build-up.

The projections 150 are oriented to be substantially perpendicular to the exterior surface 130. Such configuration may allow the projections 150 to better engage a dog's gums and the spaces between adjacent teeth when the chew toy 100 is grasped or moved around in the dog's mouth. The projections 150 are distributed on the exterior surface 130 in spaced relation to each other. That is, each projection 150 is separated from any neighboring projections on the exterior surface 130. In some embodiments, adjacent projections 150 may be spaced away from each other by at least 3.0 millimeters along the exterior surface 130. That is, each projection 150 may be separated from other projections by at least a radial distance of 3.0 millimeters (i.e. within a radius of 3.0 millimeters of a projection on the exterior surface 130, there are no other projections). The projections 150 may be uniformly distributed on the exterior surface 130. For example, the projections 150 may be distributed such that there is at least one projection per 1.2 square centimeters of the exterior surface 130.

The plurality of projections 150 includes at least one projection having a pointed tip at a distal end, that is, an end which is distal to the exterior surface 130. The pointed tip of a projection 150 may be useful for reaching the spaces between a dog's teeth, for cleaning the teeth and/or massaging gum surfaces. As in the example shown in FIG. 1, in some embodiments, each of the projections 150 of the chew toy 100 may have a pointed tip at its respective distal end. Alternatively, only select ones of the plurality of projections 150 may have a pointed tip.

In at least some embodiments, the projections 150 include at least one conical projection. That is, one or more projections 150 may have a conical shape, with a base that is disposed on or integral with the exterior surface 130, and a distal pointed tip. In some cases, the at least one conical projection may have a blunt tip, or a tip that is not sharply pointed (e.g. truncated tip). The height of a conical projection 150 may depend on the dimensions of the body 102 of the chew toy 100. For example, in some embodiments, the at least one conical projection 150 may have a height of between 3.5 and 5.0 millimeters. Other geometries, such as prisms, pyramids, and hemispheres, and combinations or truncations thereof, may be feasible for the projections 150.

The chew toy 100 may be constructed from a flexible material, such as rubber (e.g. thermoplastic rubber) or plastic (e.g. number 7 plastic). In particular, the body 102 and the projections 150 may be made from a deformable and resilient material. In some embodiments, the chew toy 100 may be made from high-resilience (HR) foam, or a composite of one or more of rubber, plastic, and foam.

Figure 2:
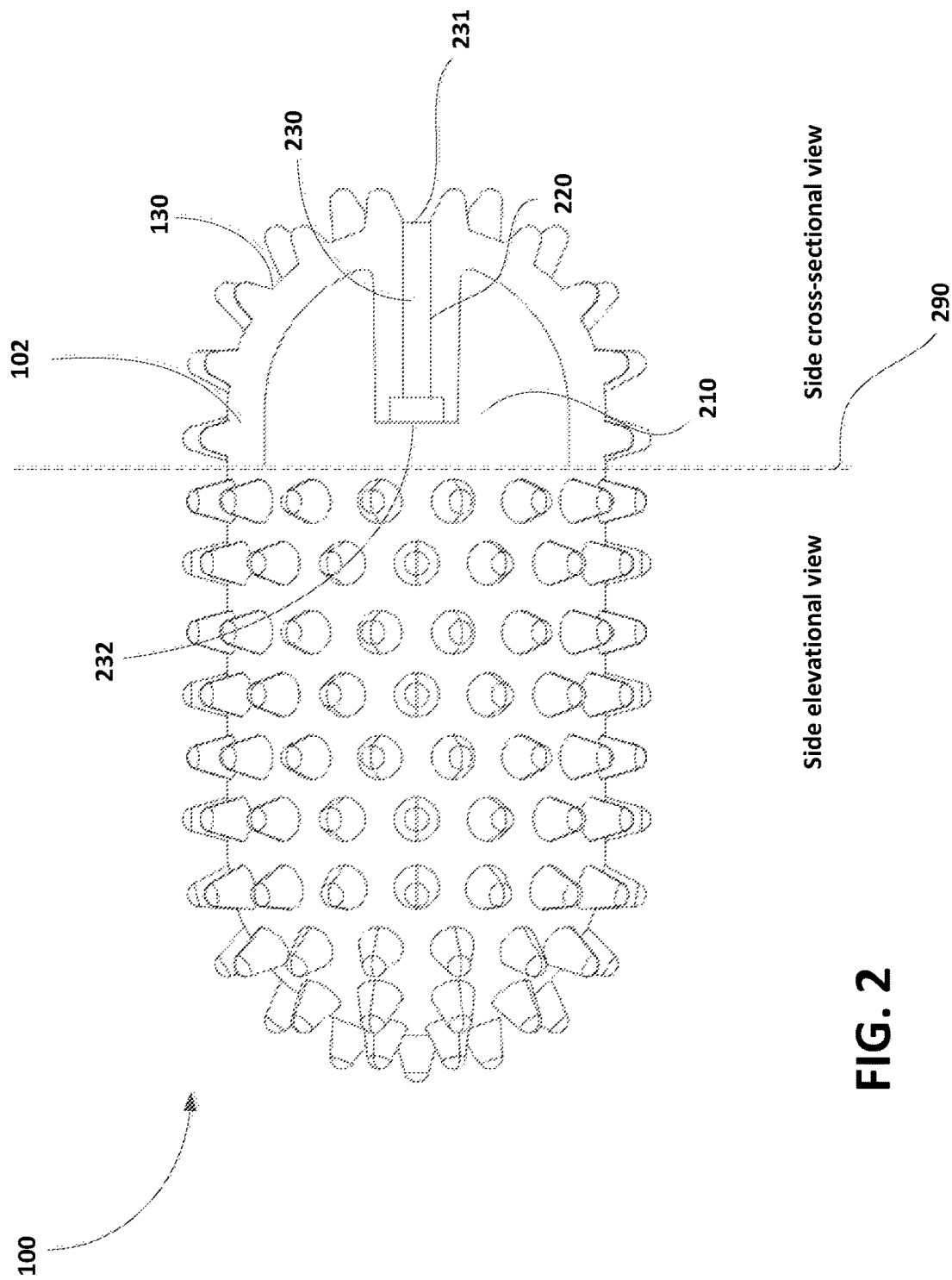
FIG. 2 is a partial side cross-sectional view of the example chew toy of FIG. 1.

Reference is now made to FIG. 2, which shows a partial side cross-sectional view of the chew toy 100 of FIG. 1. More specifically, line 290 demarcates a boundary between a side elevational view and a side cross-sectional view of the chew toy 100. As can be seen in FIG. 2, in at least some embodiments, the body 102 may comprise capsule walls which define an interior cavity 210. In particular, the body 102 may include a housing or outer casing whose walls define a partially hollowed interior. The interior cavity 210 may be configured to hold, among others, various liquids and/or dog treats.

The body 102 may further include a bore wall 220 extending from the exterior surface 130 partially into the interior cavity 210. For example, the bore wall 220 may extend from an opening on the exterior surface 130 and provide a passage between the exterior surface 130 and the interior cavity 210. The bore wall 220 defines a bore 230 having a first end 231 on the exterior surface 130 and an opposed second end 232 that opens into the interior cavity 210. In some embodiments, the bore wall 220 may define a radial bore 230 having a radius of at least 1.0 millimeter. In particular, the bore may be generally cylindrical. It will be understood that other geometries for the bore may be defined by the bore wall 220. The length of the bore wall 220, or the distance that the bore wall 220 extends from the exterior surface 130 into the interior cavity 210, may be between 1.5 and 2.5 centimeters.

The bore 230 may serve as a passageway into and out of the interior cavity 210. As a further example, the interior cavity 210 may contain various items, such as water and powdered dog food, that can travel through the bore 230 and out through an opening on the exterior surface 130 as a dog chews on the chew toy 100. In this regard, the bore 230 may further include a filter that is configured to regulate the passage of items into and out of the interior cavity 210. In particular, a filter may be provided in the bore 230 to partially block the passageway between the first end 231 and second end 232. A filter may, for example, be positioned in the bore 230 part way between the first end 231 and second end 232. In some embodiments, the filter may comprise a squeaker; when the chew toy 100 is squeezed, air may be forced out of the interior cavity 210 through the squeaker, resulting in a high-pitched sound, such as the sound of a toy horn or whistle.

In some embodiments, the bore 230 may be shaped to receive an insert of a peripheral apparatus configured to be coupled to the chew toy 100. More specifically, the bore 230 may be configured to receive an insert that is designed to fit and be secured in the bore 230. The insert may, for example, be a component that is connected to or is integral with a stand-alone apparatus. In this way, the bore 230 may facilitate connecting a peripheral apparatus to the chew toy 100. For example, a handle for the chew toy 100 may be added by fitting an insert or shaft attached to a handle member inside the bore 230 such that the handle member may be removably secured to the chew toy 100. An add-on handle may usefully allow a person to grasp the chew toy 100 without having to make contact with the projections 150 and for person to be able to play with her dog by holding onto the handle while her dog bites or chews on the body 102.

Figure 3:
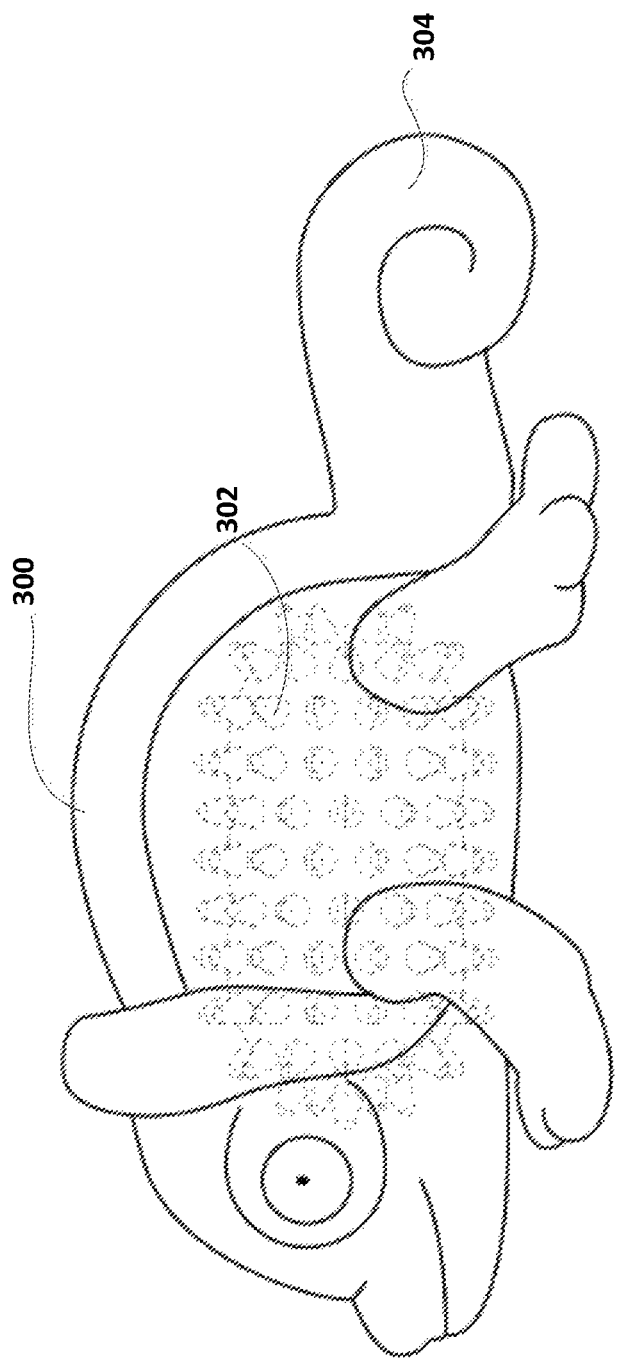
FIG. 3 is a side elevational view of an example dog toy in accordance with example embodiments of the present disclosure.

Reference is now made to FIG. 3, which shows a side elevational view of an example dog toy 300. The dog toy 300 may be used to provide amusement for a dog as, for example, a chewable object and an exercise aid for the dog. The dog toy 300 includes a chew toy 302 (shown in broken lines in FIG. 3), such as the chew toy 100 of FIGS. 1 and 2, in its interior. The dog toy 300 also includes a fabric casing 304 enclosing the chew toy 302. The fabric casing 304 has an interior space for receiving the chew toy 302. It will be understood that the fabric casing 304 may take on a variety of shapes and designs, and serves as a covering for a chew toy 302 positioned inside the fabric casing 304. The fabric casing 304 may be constructed from a durable material, such as latex, wool, cotton or rayon. For example, the fabric casing 304 may be in the form of a durable mesh encasing a chew toy 302. The fabric casing 304 can add aesthetic appeal to the dog toy 300 while providing some protection for the enclosed chew toy 302. When the fabric casing 304 is intact (e.g. when the fabric is not ripped, punctured, or removed from over the chew toy 302), a dog can chew on the fabric casing 304 and receive the benefits of a massaging effect of the projections that are disposed on the chew toy 302 encased in the fabric casing 304. If a dog chews through the fabric (e.g. fabric cover) of the fabric casing 304, the chew toy 302 may be exposed or removed entirely from the fabric casing 304, and the dog can chew directly on the chew toy 302, which facilitates cleaning and massaging of the teeth and gum surfaces. As a result, the dog toy 300 may continue to yield benefits for dogs even after the fabric casing 304 is broken or ripped from the usual wear and tear caused by biting/gnawing action of the dogs.

In at least some embodiments, the fabric casing 304 is shaped to tightly fit over the chew toy 302 when the chew toy 302 is positioned inside the interior space of the fabric casing 304. In particular, the fabric casing 304 may be shaped such that when the chew toy 302 is inserted in the interior space, the chew toy 302 can be positioned to support at least a portion of an inner wall of the interior space. In the example shown in FIG. 3, the fabric casing 304 has front-of-creature features that are disposed on its exterior surface. The front-of-creature features define a front of a creature in a first upright position. When the chew toy 302 is inserted in the interior space of the fabric casing 304, the interior space may be shaped such that the chew toy 302 supports the fabric casing 304 in the first upright position. More specifically, the chew toy 302 can be positioned inside the interior space such that the fabric casing 304 can be structurally supported in a way that allows the front-of-creature features to be displayed in a free-standing upright position.

It has been found that an elongate and capsule- or pill-like shape for a chew toy, such as the shape of the chew toy 100 of FIG. 1 and 302 of FIG. 3, allows the toy to be easily grasped and chewed on. In particular, this shape for the chew toy 302 can make the toy easier to chew on than a generally spherical or ball-shaped spiked toy. Furthermore, the elongate shape of the chew toy 302 may make it suitable for inserting into toy casings of various shapes and designs. For example, as shown in FIG. 3, the chew toy 302 may be encased in an elongate stuffed animal toy, and the elongate body of the chew toy 302 may serve as the torso portion of the stuffed animal toy. The elongate, pill-like shape of the chew toy 302 may thus allow for greater variations in design of the fabric casing 304 which houses the chew toy 302.

In some embodiments, the fabric casing 304 may include padding or stuffing in its interior. For example, an inner wall of the fabric casing 304 may be lined with one or more layers of padding such that padding is interposed between the chew toy 302 and the fabric casing 304 when the chew toy 302 is encased inside the fabric casing 304. The padding may comprise a synthetic material, such as polyester or foam, or a natural material, such as wool or down and other feathers. The amount of padding in the fabric casing 304 may be such that the massaging effect of the projections disposed on the chew toy 302 is felt through the padding and the fabric cover of the fabric casing 304. For example, in at least some embodiments, the thickness of the padding may be less than 1.5 centimeters.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A chew toy, comprising:
   an elongate body formed as a capsule having opposed first and second ends; and
   a plurality of projections extending radially outward from and substantially perpendicular to an exterior surface of the body, at least one of the plurality of projections having a pointed tip at a distal end, wherein the plurality of projections are distributed on the exterior surface in spaced relation to each other circumferentially and along substantially an entire length of the body extending between the first end and the second end, and wherein the body comprises capsule walls defining an interior cavity and wherein the body includes a bore wall bore extending from the exterior surface partially into the interior cavity.

2. The chew toy of claim 1, wherein the body and the plurality of projections are constructed of a flexible material.

3. The chew toy of claim 2, wherein the material comprises soft rubber.

4. The chew toy of claim 2, wherein the material comprises plastic.

5. The chew toy of claim 1, wherein the body comprises a cylindrical tube having opposed dome-shaped ends.

6. The chew toy of claim 5, wherein a radius of the tube is between 1.5 and 3.0 centimeters.

7. The chew toy of claim 5, wherein a height of the tube is between 4.5 and 6.0 centimeters.

8. The chew toy of claim 1, wherein the body is symmetric about a central axis that extends longitudinally through the opposed ends.

9. The chew toy of claim 1, wherein the body is symmetric about a plane which is perpendicular to and bisects a line extending between the opposed ends.

10. The chew toy of claim 1, wherein the plurality of projections comprise at least one conical projection having a base on the exterior surface and a pointed tip at a distal end.

11. The chew toy of claim 10, wherein the at least one conical projection has a blunted tip.

12. The chew toy of claim 10, wherein a height of the at least one conical projection is between 3.5 and 5.0 millimeters.

13. The chew toy of claim 1, wherein a length of the body is between 8.0 and 10.0 centimeters.

14. The chew toy of claim 1, wherein the plurality of projections are uniformly distributed on the exterior surface.

15. The chew toy of claim 1, wherein adjacent projections are spaced away from each other by at least 1.0 millimeters along the exterior surface.

16. The chew toy of claim 1, wherein the plurality of projections are integral with the body.

17. A dog toy, comprising:
   a chew toy including:
      an elongate body formed as a capsule having opposed first and second ends; and
      a plurality of projections extending radially outward from and substantially perpendicular to an exterior surface of the body, at least one of the plurality of projections having a pointed tip at a distal end, wherein the plurality of projections are distributed on the exterior surface in spaced relation to each other circumferentially and along substantially an entire length of the body extending between the first end and the second end; and
   a fabric casing enclosing the chew toy, the fabric casing defining an elongate interior space for receiving the body of the chew toy, wherein the interior space extends lengthwise within the fabric casing.

18. The dog toy of claim 17, wherein the fabric casing is shaped to tightly fit over the chew toy such that the chew toy supports at least a portion of an inner wall of the interior space.

19. The dog toy of claim 18, wherein the fabric casing has one or more front-of-creature features disposed on an exterior surface, the front-of-creature features defining a front of a creature in a first upright position, and wherein the interior space is shaped such that the fabric casing is supported in the first upright position when the chew toy is inserted in the interior space.

* * * * *